(12) United States Patent
Schkolne et al.

(10) Patent No.: US 7,212,197 B1
(45) Date of Patent: May 1, 2007

(54) THREE DIMENSIONAL SURFACE DRAWING CONTROLLED BY HAND MOTION

(75) Inventors: Steven Schkolne, Los Angeles, CA (US); Peter Schroeder, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/496,137

(22) Filed: Feb. 1, 2000

Related U.S. Application Data

(60) Provisional application No. 60/118,196, filed on Feb. 1, 1999.

(51) Int. Cl.
*G06T 15/00* (2006.01)

(52) U.S. Cl. ............... 345/419; 345/427; 345/428; 345/619

(58) Field of Classification Search ................ 345/419, 345/427, 428, 619
See application file for complete search history.

(56) References Cited

U.S. PATENT DOCUMENTS

| 5,528,263 | A | * | 6/1996 | Platzker et al. ............. 345/156 |
| 6,268,865 | B1 | * | 7/2001 | Daniels et al. .............. 345/582 |
| 6,501,515 | B1 | * | 12/2002 | Iwamura .................... 348/734 |
| 6,549,201 | B1 | * | 4/2003 | Igarashi et al. ............. 345/423 |

OTHER PUBLICATIONS

Nishino et al., 3D Object Modeling Using Spatial and Pictographic Gestures, VRST 98, ACM, pp. 51-58, Nov. 1998.*
Schkolne et al., Surface Drawing: Creating Organic 3D Shapes with the Hand and Tangible Tools, SIGCHI'01, Apr. 2001, pp. 261-268.*
Nishino et al., Interactive Two-Handed Gesture Interface in 3D Virtual Environments, ACM VRST '97, Sep. 1997, pp. 1-8.*
Brody et al, Body Language User Interface, BLUI, SPIE, Jan. 1998, pp. 400-407.*
Wang et al., Volume Sculpting, Symposium on Interactive 3D Graphics, ACM 1995, pp. 151-156.*
Keefe et al., CavePainting: A Fully Immersive 3D Artistic Medium and Interactive Experience, ACM 2001, pp. 85-93.*
Anderson et al., "Tangible Interaction + Graphical Interpretation: A New Approach to 3D Modeling," Proceedings of SIGGRAPH 2000, 393-402.
Brody et al., "BLUI, a Body Language User Interface for 3d Gestural Drawing," SPIE Proceedings vol. 3644: Human Vision and Electronic Imaging IV, 1999.
Cohen et al., An Intrerface for Sketching 3D Curves:, Brown University, Symposium on Interactive 3D Graphics, At;anta GA I-58113-082-1/00/04 1999.

(Continued)

*Primary Examiner*—Phu K. Nguyen
(74) *Attorney, Agent, or Firm*—Fish & Richardson P.C.

(57) ABSTRACT

Surface drawing is described as a medium which provides direct control over the creation of a wide range of intricate shapes. Surfaces are created by moving a hand, instrumented with a special glove, through space in a semi-immersive 3D display and interaction environment. Intricate forms can be created using intuitive motions. The design space can be freely explored during the modeling process without the need to plan the construction of the final shape. In particular it supports unconstrained erasing and buildup of new geometry. An incremental Cookie Cutter algorithm, a construction method for triangulated meshes is described which allows the user to freely grow, join, and erase surfaces based on hand motions.

22 Claims, 10 Drawing Sheets

OTHER PUBLICATIONS

Deering, M. F., "HoloSketch: A Virtual Reality Sketching/Animation Tool," ACM Transactions on Computer-Human Interaction 2,3 (Sep. 1995), 220-238.

Edelsbrunner et al., "Three-Dimensional Alpha Shapes," 1992 Workshop on Volume Visualization (1992), 75-82.

Fitzmaurice et al., "Bricks: Laying the Foundations for Graspable User Interfaces," Proceedings of CHI AMC Press, 1995.

Galyean et al., "Sculpting: An Interactive volumetric modeling technique," In Computer Graphics 'SIGGRAPH '91 Proceedings), T W. Soderberg, Ed., vol. 25, 267-274, Jul. 1991.

Grimm et al., "Modeling Surfaces of Ajrbitrary Topology using Manifolds," In SIGGRAPH 95 Con rence Proceedings, R. Cook, Ed., Annual Conference Sends, 359-368, Aug. 1995.

Han et al., "13DSketch: Modeling by Digitalizing with a Smart 3D Pen," In ACM Multimedia 1997,41-49, 1997.

Hinckley et al., "Cooperative Bimanual Action," University of Virginia, ACM CHI'97 Conference on Human Factors in Computing Systems 1997.

Igarashi et al., "Teddy: A Sketching Interface for 3D Freeform Design," Proceedings of SIGGRAPH 99 (1999), 409-416.

Keefe et al., "CavePainting: A Fully Immersive 3D Artistic Medium and Interactive Experience," Proceedings of the 2001 Symposium on Interactive 3D Graphics, 85-93.

Kruger et al., "The Responsive Workbench: A Virtual Work Environment," IEEE Computer 28, 7 (Jul. 1995),42-48.

Llamas et al., "Twister: A Space-Warp Operator for the Two-Handed Editing of 3D Shapes," Proceedings of Siggraph 2003.

McDonnel et al., "Virtual Clay: A Real-Time Sculpting System with Haptic Toolkits," 2001 Symposium on Interactive 3D Graphics, 179-190.

Ullmer et al., "The metaDESK: Models and Protytypes for Tangible User Interfaces," Proceedings of UIST '97, ACM 1997.

Wang et al., "Volume Sculpting. In 1995 Symposium on Interactive 3D Graphics," P Hanrahan and J. Winget, Eds., 151-156, Apr. 1995.

Wesche, Gerold, "The ToolFinger: Supporting Complex Direct Manipulation in Virtual Environments," Proceedings of the ACM/Eurographics Workshop on Virtual environments 2003, 39-45.

Zeleznik et al., "An Interface for Sketching 3D Scenes," In SIG-GRAPH 96 Conference Proceedings, H. Rushmeier, Ed., Annual Conference Series, 163-170, Aug. 1996.

Amenta et al., "A new voronoi-based surface reconstruction algorithm," SIG-GRAPH 98, Conference Proceedings, M. Cohen, Ed., Annual Conference Series, pp. 415-433, (Jul. 1998).

Barr, A.H., Global and local deformations of solid primitives, Computer Graphics (SIGGRAPH '84 Proceedings), H. Christiansen, Ed., vol. 18, pp. 21-30, (Jul. 1984).

Guibas, L. and J. Stolfi, "Primitives for the manipulation of general subdivisions and computation of Voronoi diagrams," ACM Transactions of Graphics vol. 4, No. 2, pp. 74-123, (Apr. 1985).

Kruger, W. and B. Frohlich, "The Responsive Workbench," IEEE Computer Graphics and Applications,pp. 12-15 (May 1994).

Lischinski, D., "Incremental Delaunay Triangulation," Graphics Gems IV, P.S. Heckbert, Ed. , Academic Press Professional, San Diego, California, pp. 47-59 (1994).

Mencl, R. and H. Muller, "Interpolation and Approximation of Surfaces from Three-Dimensional Scattered Data Points," Informatik VII (Computer Graphics), Tech Rep. 662, University of Dortmund, Germany, Dec., 10 pages, (1997).

Sachs, E et al., "3-Draw: A tool for designing 3D shapes," IEEE Computer Graphics & Applications 11(6): 18-26 (Nov. 1991).

Schkolne, Steven and Peter Schröder, "Surface drawing," California Institute of Technology Computer Science Department Technical Report CS-TR-99-03, 10 pages, (1999).

Sederberg, T.W. and S.R. Parry, "Free-form deformation of solid geometric models," Computer Graphics (SIGGRAPH '86 Proceedings), D.C. Evans and R.J. Athay, Eds. vol. 20, pp. 151-160, (Aug. 1986).

Sutherland, I.E., "Sketchpad—A Man-Machine Graphical Communication System.," AFIPS Conderence Proceedings of the Spring Joint Computer Conference, Detroit, Michigan, vol. 23, pp. 329-346, (May 1963).

Szeliski, R. and D. Tonnesen, "Surface modeling with oriented particle systems," Computer Graphics (SIGGRAPH '92) Proceedings, E.E, Catmull, Ed., vol. 26, pp. 185-194 (Jul. 1992).

Taubin, G., "A signal processing approach to fair surface design," Computer Graphics (SIGGRAPH'95 Proceedings), pp. 351-358 (1995).

Van Overveld, C.W.A.M., "Painting Gradients: Free Form Surface Design Using Shading Patterns," Graphics Interface '96, W.A. David & R. Bartels, Eds., pp. 151-158 (May, 1996).

* cited by examiner

THREE DIMENSIONAL SURFACE DRAWING CONTROLLED BY HAND MOTION

CROSS-REFERENCE TO RELATED APPLICATIONS

This application claims benefit of U.S. Provisional Application No. 60/118,196, filed Feb. 1, 1999.

U.S. Government may have certain rights in this invention pursuant to Grant No. ACI 9721349 awarded by NSF.

BACKGROUND

The state of the art in three-dimensional modeling can represent a variety of complex smooth surfaces. When artists and designers create shapes with these techniques, it is often observed that often the method of surface representation restricts the ways in which a shape can be modeled.

Traditional spline-based modeling can be used to represent many different shapes, for example. A user often needs to think of the most efficient way to represent a shape before beginning the modeling process. However, changing directions once in the design process often requires a drastic change in the underlying placement of patches and may require extra work. The traditional shape modeling approach of the graphics and CAD communities is fundamentally different from the approach taken by the artistic community.

SUMMARY

The present application describes a system of Surface Drawing that allows creating shape in which surfaces are created by moving a locally two-dimensional object through three-dimensional space.

BRIEF DESCRIPTION OF THE DRAWINGS

These and other aspects will now be described in detail with respect to the drawings in which.

DETAILED DESCRIPTION

The pencil is perhaps simplest of all modeling tools. It is an extraordinarily effective conduit for artistic expression. Part of the reason for this is its simplicity. Another reason for its success is the close relation between an artist's perception, and the action and the forms the pencil produces.

This link yields direct control over all aspects of form in a two dimensional drawing tool. Surface Drawing, which is described herein, provides direct control over three-dimensional space in an analogous way to how a pencil commands two-dimensional space.

Surface Drawing uses motions of the human hand to describe shapes. As the hand is moved in a semi-immersive environment, a surface is grown by adding the shape defined by the hand movement at each sampling interval. The versatility and natural understanding of the hand, combined with the simplicity of this process, allows for an intuitive modeling process in which the user can think perceptually about a shape while constructing the shape. While the resulting surface might not meet certain analytic criteria, such as curvature continuity, forms can be constructed with gestural, emotive qualities that are difficult to achieve with traditional surface modeling tools. This system has both the ease of use that novices expect and the control that experts demand. These tools support conceptual design and the artistic process. These methods are distinct from those focusing on exact specification of geometry, as needed in traditional CAD.

Perceptual Thinking

In his seminal text "Visual Thinking", Arnheim describes the importance of perception in our thought processes:

"THE COGNITIVE OPERATIONS CALLED THINKING ARE NOT THE PRIVILEGE OF MENTAL PROCESSES ABOVE AND BEYOND PERCEPTION, BUT THE ESSENTIAL INGREDIENTS OF PERCEPTION ITSELF."

Visual thinking can be expanded to include all of the senses (including proprioception) in what we call perceptual thinking. Perceptual thinking is a process in which understanding is achieved through direct perception, without being translated into a higher linguistic or mathematical form. In a problem solving environment, application of perceptual thinking minimizes the distance between perception and the artifact being created.

Consider the example of describing a set of points on a two-dimensional grid for later display. A weak perceptual interface for this task would be to write down coordinates for these points or enter them with a keyboard, only allowing the user to see them after the input is complete. A strong perceptual interface would be to draw the points on a piece of paper, or allow the user to enter them with a touch-sensitive computer display. The latter form of interaction gives the user a much stronger aesthetic control over the points being described.

Applying these principles, the present application develops the following guidelines for an interactive modeling system:

Invisible Mathematical Structure

The behavior of the modeling system should be based upon simple physical interactions that are understood via direct perception. The user should think primarily in terms of the model being created, instead of a structure that must be created to support that model. Any mathematical structure that exists should support arbitrary changes in the model in a way that is transparent to the user.

Direct Primitives

Presenting an artist with a series of complex primitives (sphere, cube, cone, etc.) forces thought in terms of these primitives. Unless the solution space inherently includes these primitives (packing oranges or stacking bricks) they will only take the user a step away from the form of a model. Primitives should be the essential constituent parts of the modeling space.

The interface should make it easy for the user to observe the object being modeled in term of its number of dimensions. The modeling tool should have easy control over all of its degrees of freedom.

The modeling operations should consist of few tools. If the number of such tools is large, thought must be used to decide which tool to use, instead of contemplating the object being modeled.

Requiring an artist to create a simple object and then edit it repeatedly to get the shape they desire forces many unnecessary intermediate perceptions which have little to do with the final product. Tools should be capable of sophisticated creation during the early stages of design.

Sensory completeness—The visual, haptic, and other senses should be used to better understand the model being created.

A trained artist holds a pencil such that the contact between the pencil and the paper (two-dimensional space) is in the form of a line. In the present Surface Drawing technique, the metaphor is extended. The contact between the user and three-dimensional space is a plane. Drawing with a pencil is much like adding locally one-dimensional coordinate patches to a one-manifold. Modeling surfaces is the process of making two-manifolds, and Surface Drawing does this via the natural extension of adding two-dimensional coordinate patches. In short, this system views drawing as the development of a manifold with codimension one.

Figure 1A:
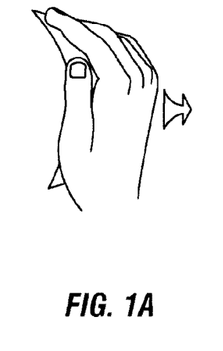
FIGS. 1A and 1B shows using the inside of the hand surface to model form surfaces.
Figure 1B:
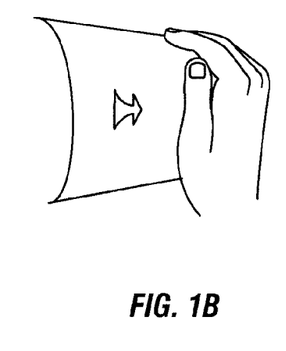

An embodiment uses the inside surface of the hand to form the modeled surfaces as shown in FIGS. 1A and 1B. The motion of the hand shown in FIG. 1A defines portions of surfaces as shown in FIG. 1B. The hand moves to define the tangent plane of the surface being created, analogously to a pencil moving in the tangent line of a curve drawing. A few hand motions can be combined rapidly to form a much more elaborate surface.

Figure 2:
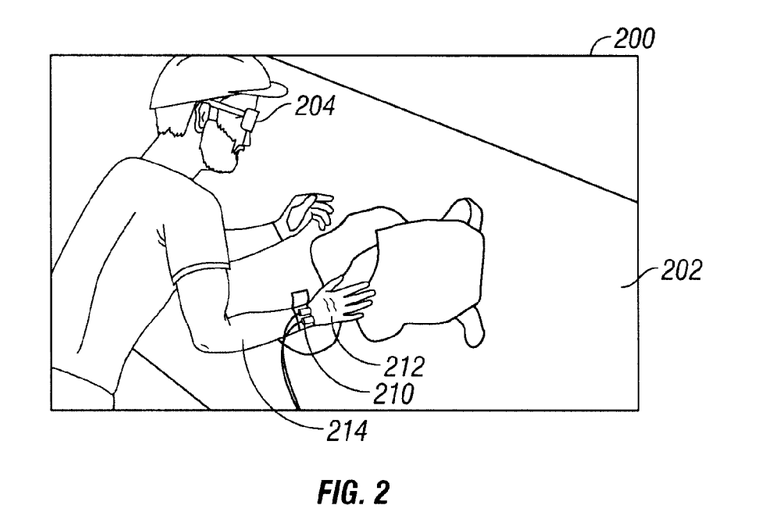
FIG. 2 shows the responsive workbench which forms the exemplary input device.

The input device needs to be able to track hand movements. The Responsive Workbench, shown in FIG. 2 is used as the input device in this embodiment. Its horizontal top surface measuring 1.8×1.35 m displays alternating left/right stereo images which are viewed through magnetically tracked shutter glasses. The position and orientation of the interface tools include a stylus 210 and glove 212. These are also sensed with magnetic trackers 214. Other input devices which supports multiple degrees of freedom on input and three-dimensional viewing of objects can be used. For example, five degrees of freedom, six degrees of freedom or seven degrees of freedom are the most common values.

In this multiple dimensional environment, there is a perceptual connection between the form of the hand as it moves through space and the surface that is generated. This perceptual creation, along with the perceptual viewing of the model, allows shapes to be understood at a deep level while they are created.

The system is used to construct surfaces as follows.

Data from the tracker and glove is used to create a mesh of triangles that describes the surface being drawn. From the user's perspective, the hand is acting as a guide for a plane. To construct a surface efficiently, the hand is viewed as a group of samples consisting of position and orientation, shown in FIG. 3. Placing these samples as points in three-space, without connecting them, does not give a strong sense of the underlying surface being formed. A special "Cookie Cutter" technique incrementally constructs a surface from these samples. This problem is similar to the well-studied surface reconstruction problem with some key differences exist between the traditional reconstruction setting.

In the present system input Data, normal vectors, in addition to positions, are given;

Locality: since the sample points are added interactively, global information about the sample set is not used;

Speed: the construction must be performed within tight delay and update limits to sustain the illusion of virtual reality.

Figure 4A:
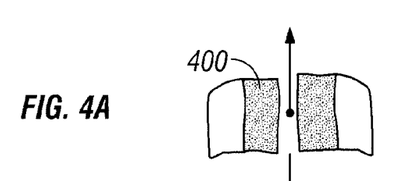
FIGS. 4A–4D shows and overview of the present system of forming shapes.
Figure 4B:
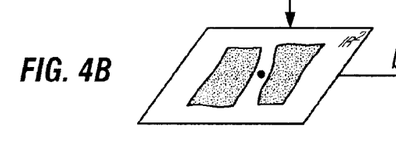
Figure 4C:
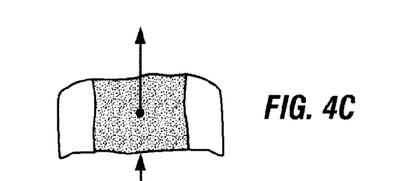
Figure 4D:
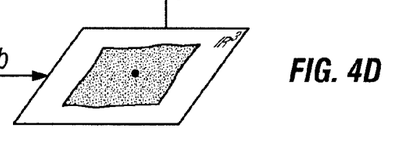

FIGS. 4A–4D show an overview of the Cookie Cutter technique. A surface patch 400 (shaded) near the new sample is identified in FIG. 4A. This patch is projected onto $R^2$ in FIG. 4B. At FIG. 4C, the data is retriangulated. Finally, FIG. 4D shows moving the data back to the original mesh.

Approaches to reconstruction that use three-dimensional triangulation are known, including Edelsbrunner's alpha shapes and Amenta's crust algorithm. These have high computational costs. The Cookie Cutter technique avoids this overhead by retriangulating in two dimensions. Further detail of the construction process is described in the following.

Figure 5:
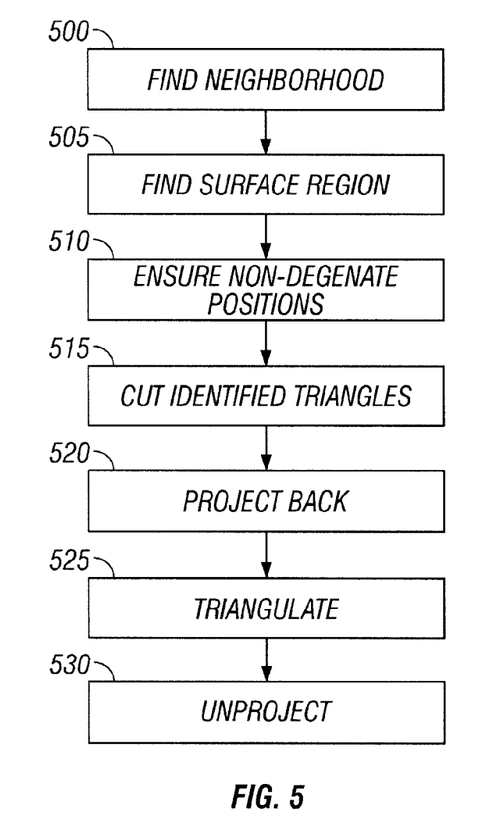
FIG. 5 shows a flowchart of the Cookie Cutter technique.

The incremental Cookie Cutter technique takes an existing mesh of samples S, Edges E, and triangles T, M=(S,E,T) and changes it to reflect the addition of a new sample x. A sample is a position in $R^3$ and a corresponding unit normal vector indicating direction, $x=(x_p, x_d)$. After receiving x, the Cookie Cutter algorithm carries out the process of FIGS. 4A–4D, as shown in the flowchart of FIG. 5. At step 500, the find neighborhood process is carried out. This is done by identifying a neighborhood of samples $N_s(x) \subset S$ to which the new sample x should be added.

At step 505, the proper surface region is identified.

The triangles $N_t(x) \subset T$ that correspond to this neighborhood are found, along with a number of boundary edges $N_e(x) \subset E$ describing the boundary of the surface region being removed.

Step 510 ensures the non-degenerate projection.

If any of the triangles $N_t(x)$ will be flipped upon projection into the plane defined by xd, the neighborhood $N_s(x)$ is reduced, and both $N_t(x)$ and $N_e(x)$ are updated.

Step 515 carried out a cut in which the identified triangles $N_t(x)$ are removed from the mesh M.

At step 520, each sample in $N_s(x)$ and each boundary edge in $N_e(x)$ are projected back into the plane defined by $x_d$.

This information is triangulated at step 525. The projection of is triangulated using a two-dimensional Delaunay triangulation with some modifications;

Step 530 Unprojects by mapping each resulting Delaunay triangle back to $R^3$ by the implicit association through $N_s(x)$.

Each of these steps is now described in detail.

Find Neighborhood

Figure 6A:
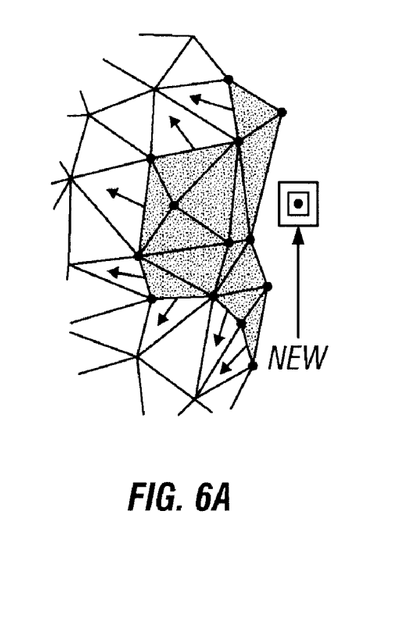
FIGS. 6A–6D illustrate finding and replacing mesh parts.
Figure 7A:
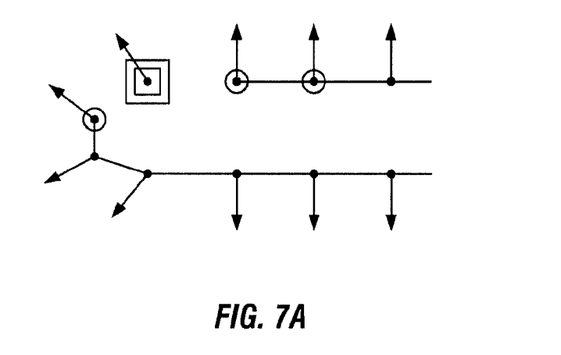
FIGS. 7A and 7B show finishing surface parts.
Figure 7B:
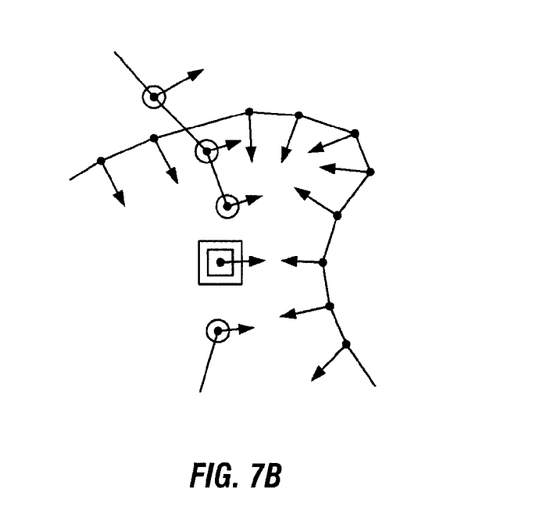

Given a new sample x, its sample neighborhood $N_s(x)$ includes all samples that satisfy the following two conditions:

$$\|x_p - s^i_p\| < d_{max}$$

and $$|x_d \cdot s^i_d| > \cos(\theta_{max})$$

Where $\|\cdot\|$ is the standard Euclidean metric. Samples satisfying these conditions are shown as heavy dots in the example of FIG. 6A. In practice, $d_{max}=5$ cm and $\theta_{max}=60°$ have been found to work well. These conditions choose a neighborhood that is near the new sample both in terms of position and orientation. As shown in FIGS. 7A and 7B, this mixed distance/orientation criterion allows effective processing of regions of high curvature or of intersection of multiple surfaces. Surface parts with opposite orientations that are arbitrarily close to one another can be handled.

The Find surface region of step 505 looks at the triangle neighborhood $N_t(x)$ which consists of triangles whose vertices are all in $N_s(x)$. $N_t(x)$ is shaded in FIGS. 8A–8D. This represents the set of triangles that might be changed when $N_s(x)$ is retriangulated. While finding $N_t(x)$, an array of signed edges, called boundary edges $N_e(x)$, is filled with edges of triangles that contain only two points in $N_s(x)$. Boundary edges are represented as arrows in FIG. 6(a). A boundary edge is a segment of the boundary between the surface neighborhood of x and the remainder of M. The set of boundary edges around a given sample forms our cookie cutter. Each boundary edge is oriented using the third vertex of the triangle that was found to contain only two neighborhood samples. This orientation is used to prune triangles formed outside of the boundary in the retriangulation process and to ensure a non-degenerate projection.

Ensure Non-degenerate Projection

Figure 8:
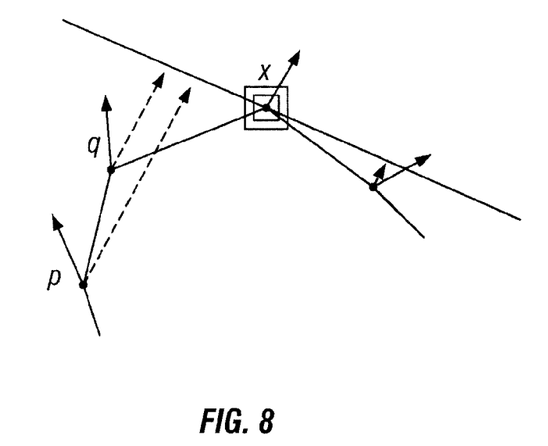
FIG. 8 shows how triangles are flipped.

In cases of high curvature and sample noise, projection onto the tangent plane of x can flip triangles when they are projected in the tangent plane. This situation is shown in FIG. 8. In practice, this situation occurs quite rarely. However, when it does happen, it causes a hole in mesh M. Step 510 checks for this problem by storing an orientation $t_i d$ for each triangle in t. Each triangle normal $t^i_d$ is chosen using the orientation of M. If $t^i_d \cdot x_d < 0$ for any triangle in t, $d_{max}$ is reduced and $N_s(x)$, $N_t(x)$ and $N_e(x)$ are recomputed.

Cut

The cutting step 515 removes the triangles in $N_t(x)$ from the mesh.

Project

After correctly calculating a neighborhood, the local surface region or "cookie" is ready for retriangulation at 520. Basis vectors on the tangent plane of x are chosen, and each point in $N_s(x)$ is given coordinates in terms of these vectors. The edges $N_e(x)$ that define the boundary are also projected onto the tangent plane at x. The orientation of any boundary edge $e_i \epsilon N_e(x)$ can flip upon projection, in a fashion similar to that of a triangle flipping. A dot product test similar to that for triangles is performed. Failing the test causes the orientation of the associated boundary edge $e^i$ to be changed, to ensure correct behavior.

Triangulate

Figure 6B:
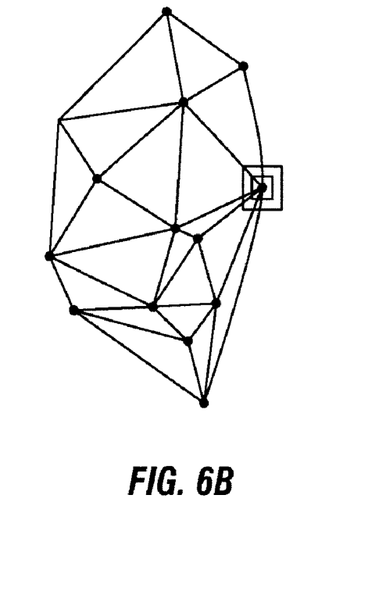
Figure 6C:
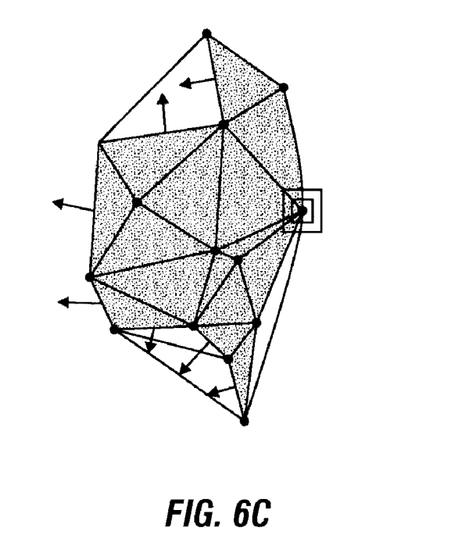
Figure 6D:
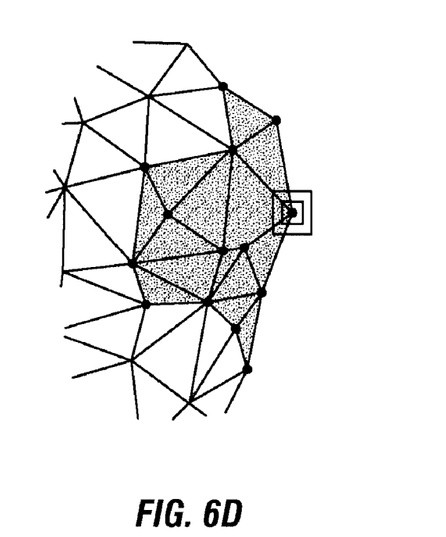

FIG. 6(b) shows an example of a two-dimensional Delaunay triangulation. Note that it may contain triangles that are outside of a boundary edge e.g., shown in FIG. 6(c). These are removed to preserve the cookie cutter outline of the neighborhood that was originally removed from the mesh. After this cleanup the triangles are ready to be reinserted into the original mesh as shown in FIG. 6(d).

A problem with traditional Delaunay triangulations is that the resulting triangulation is always convex. Users often make planar regions with concave boundaries which should be reflected in the mesh. Removing triangles such as the triangle in the lower right-hand corner of FIG. 6(c) whose associated circumcircles have prohibitively large radii e.g. larger than 2.5 cm allows the boundaries of meshes to be concave.

Unproject

The vertices of triangles in the retriangulation are all associated with samples in the original mesh through the tangent plane projection. Each of these samples are mapped back to their original locations in $R^3$, moving the new triangulation into the three-dimensional space in which the user is working.

The Cookie Cutter approach uses sample neighborhood construction and boundary computation. Using orientation information to prune the Euclidean neighborhood allows planar subsets to be found in many difficult regions, such as neighborhoods with intersecting or almost-touching surfaces.

Storing a boundary allows a very efficient local retriangulation process. The Delaunay triangulation is O(nlogn) with a typically small n. The other steps are O(n) all with the same small n. The construction of the sample neighborhood $N_s(x)$ is optimized with a regular grid spatial data structure.

Unlike the surface reconstruction setting, where the data can be assumed to come from a clean surface, the Cookie Cutter algorithm has to deal with "messy" samples. This is due to the inherent noise in the tracking system and the unsteadiness of users' hands in this environment.

This technique forms clean surfaces the majority of the time. Holes and nonmanifold topology may occur about one percent of the time (one bad vertex per 100 vertices). These situations can be easily fixed by a user. Automatic mending is also contemplated.

Noise also causes the meshes to be quite bumpy at times. Thus, we apply a simple Laplacian mesh smoother as described can be used as a post-process.

Figure 9A:
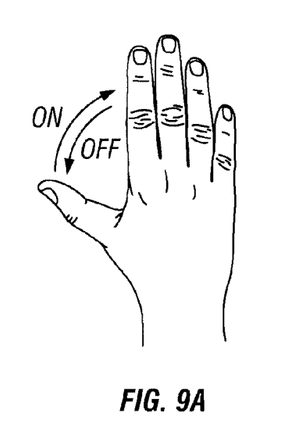
FIGS. 9A–9C show tools formed from and positions.

As discussed above, specific hand positions are tracked to form the user interface. These hand positions can also be used for adding geometry, for an eraser to remove geometry, and as a simple manipulation tool. The tools that affect geometry can accessed with three hand configurations shown in FIGS. 9A, 9B and 9C. The manipulation tool is assigned to a magnetically tracked stylus.

Primary Input

Figure 3:
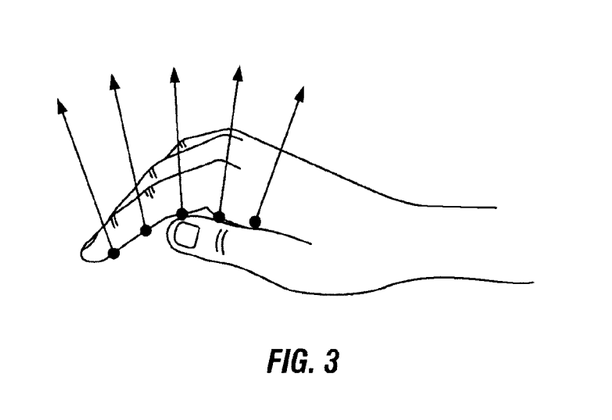
FIG. 3 shows defining the hand shape.

The choice of hand samples is important in allowing geometry to be placed effectively. The present application samples the index finger and the palm of the inside surface of the hand as shown in FIG. 3. Normals are taken as the normals of the outer surface of the hand. The user moves the hand as if running it across the object being created, in a direction perpendicular to the plane along which the finger bends. This allows the description of surfaces with a considerable range of curvature. With this system, drawing can be easily started and stopped by pressing the thumb against the index finger (see FIG. 9(a)). Since the elastic tension in the CyberGlove naturally holds the thumb in the "off" position, users rarely draw accidentally. Users can learn this on/off mechanism quite readily.

Eraser

Users often want to correct or remove regions of a surface that they have made. Rather than introducing complex editing semantics, a simple spherical eraser tool is used. It is moved through 3D space, deleting geometry in its wake. All the samples and their associated triangles that are within the sphere of the eraser are removed.

Figure 9B:
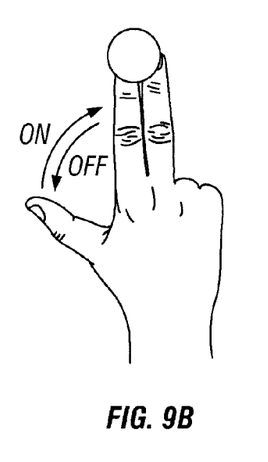

The user switches from draw mode to erase mode by bending the metacarpophalangeal joints on the 4th and 5th fingers while keeping the other fingers straight as shown in FIG. 9B. Erasing is also activated by pressing the thumb against the index finger. Since geometry can be added with ease, this simple means of editing is sufficient.

Manipulation

The user frequently needs to work on the model from different views, requiring the ability to translate and rotate.

In a 3D semi-immersive environment it is quite natural to accomplish this with a virtual stick which can be "poked" into the object. The object then follows the position and orientation of the stick, providing a direct manipulation ability. A tracked stylus can be used, which the user holds in the subdominant hand while creating geometry with the dominant hand.

Detail Input

Figure 9C:
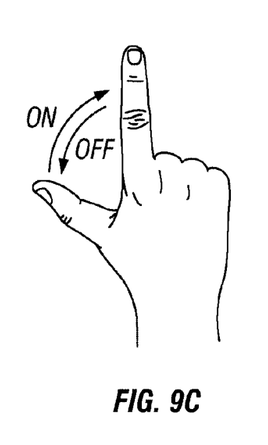

Users often want to add small details to their models. The current system allows users to add small pieces of surface used the tip of the index finger. This mode is accessed by bending the 3rd, 4th, and 5th fingers while keeping the index finger straight as shown in FIG. 9C. The hand is sampled as before but the samples from the distal phalanx are used.

The concept of finger portions can also be used to select and effect other input modes.

Discussion

In our experiments we found that this interface was learned quite readily. One of the nice features of this system is that there is no stored interface state. The hand configuration affects how the drawing happens, and the user is never asked to perform a mode switching action requiring a movement away from the object. The manipulation task, which does not require high precision, is assigned to the subdominant hand. Moving geometry is necessary for both drawing and erasing, and this two-handed interface ensures that the stick is always accessible.

The modeling guidelines discussed above are discussed herein.

Invisible Mathematical Structure

There is no underlying structure on the mesh of the present invention. The user does not have to think about coordinate systems or control vertices. The only structure that is present is orientation. With tracker noise and a modest sampling rate, this is necessary to enable surfaces to touch without merging. Shading the two sides of surfaces differently gives a direct perceptual cue to this orientation, and we found that the concept was understood by users.

Direct Primitives

No predefined surfaces are used as starting points for modeling, nor are they combined to form more complex objects. The primitive in this approach, from the user's point of view, is a small locally two-dimensional patch which, as manifold theory indicates, is the elemental component of a surface.

Full Dimensions

The tracked hand moving in space together with the stereo view give our implementation full dimension.

Small Toolset

Our entire interface for manipulating and creating geometry consists of four modes/tools: primary input, erasing, manipulation, and detail input. These modes are easily accessible via a change in hand position, and do not require any operations, such as selecting a menu, before a tool can be used.

Direct Creation

Our system provides a highly versatile method for creating form. Changing models during the early stages of ideation is more a process of creation than editing.

In our system there is essentially no dependence of the final shape on the history of its creation, fully supporting users changing their minds as they model.

Sensory Completeness

The use of the hand allows the sense of proprioception to be used. The visual image of the model matches the positions of the hand, forming a sensory loop.

Second Implementation

Figure 10:
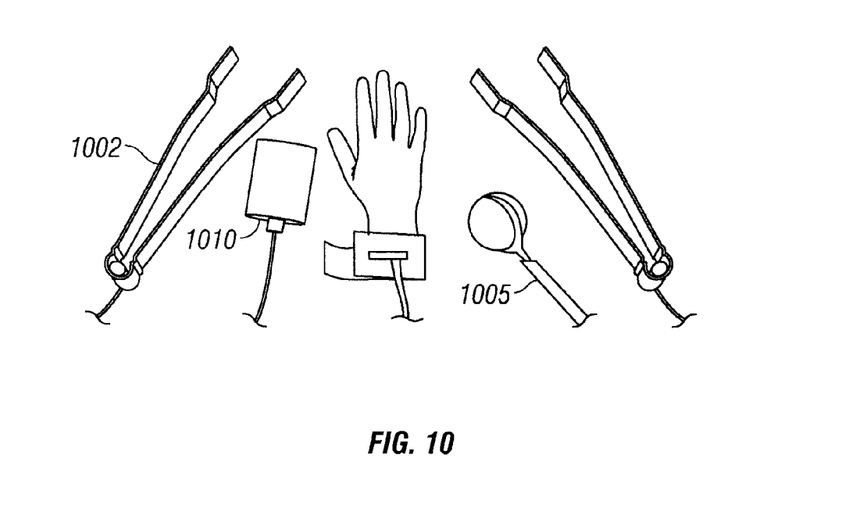
FIG. 10 shows a collection of physical props used for interaction with the system according to a second embodiment.

A second implementation described herein, has the following key differences a complete hand path is taken as a "stroke", which is fused to the mesh when it is completed a new technique is used to fuse a stroke onto the mesh physical props are used for interaction a new smoothing operator is used to fix the mesh a technique is disclosed for this smoothing operation a new drawing technique discloses the ability to overdraw in order to correct a shape Props A collection of physical props is shown in FIG. 10. These tools are used for editing operations, to cut down on interface-induced cognitive overhead so that all effort is focused on the creative process. A single pair of "tongs" 1002 is used for 6-DOF motion. Tongs are used for positioning and scaling. When a pair of tongs is squeezed shut, the user can translate and rotate the model. If both pairs of tongs are used together, this specifies two anchor points with which the model can be scaled, rotated, and translated. A spherical ball 1005 serves as an eraser, removing geometry wherever it touches the model.

A "sponge" 1010 is swept over the model for smoothing. The sponge's physical squeezability is used to activate the smoothing operation. Furthermore, the sponge itself carries the semantic connotation of cleaning or polishing, which can also help. The same kind of physical affordance is used in a squeezable ball that acts as an eraser. Though these tools share a physical affordance, their distinct shapes indicate their differing functionality.

The use of props in Surface Drawing allows for direct manipulation of the model. Proper tool design allows the user to incorporate knowledge of the tool's syntax into physical memory. In this case, the user no longer thinks about how to operate the tool, but instead concentrates on the task at hand. The physical configuration of the props at a given time indicates the interface state.

A physical-digital object can be thought of as "a physical object whose form and materials are designed to enable people to directly access and manipulate digital information as though it were tangible." The props disclosed here follow the physical-digital object. The physical actions for smoothing, erasing, and moving the model are tightly coupled with their respective digital operations. Since tools sometimes need to pass through drawing regions to access certain areas of a model, they cannot be continuously operative. Hence tools are activated through squeezing.

The present application teaches after a stroke is finished, it is fused to the current drawing using a fusing algorithm described herein. A technique of overdrawing is also described herein.

Erasing: Erasing is trivially implemented by removing all triangles that are within or partially within the sphere defined by the outside of the erasing ball.

Smoothing: Smoothing is accomplished with a simple Laplacian operation. In topologically degenerate situations, the smoothing operation leverages the algorithm described in Section herein, to convert the mesh into a topological manifold.

Translating, Rotating, Scaling: The tongs apply transformations to the mesh. These transformations which are computed using standard transformation matrices.

Stroke Fusing

Figure 11:
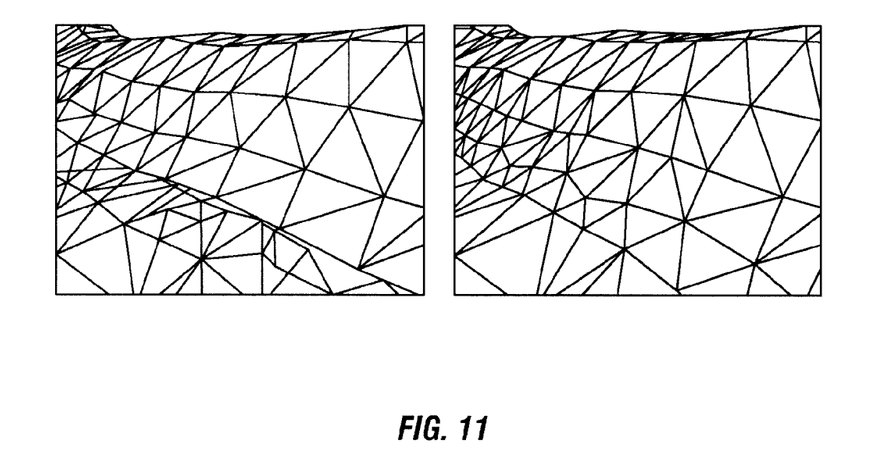
FIG. 11 shows boundary strokes.
Figure 12:
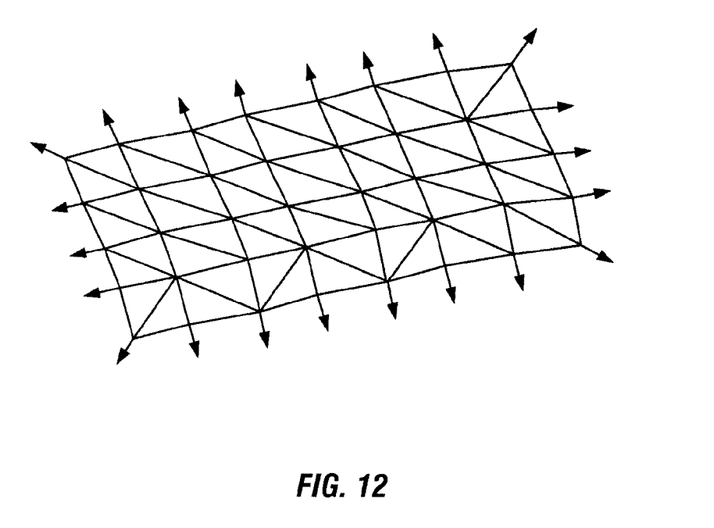
FIG. 12 shows triangulated strokes.

FIG. 11 shows fusing: After a stroke is placed as shown on the left, portions of its boundary which are near enough to the extant drawing are joined to the drawing shown on the right by associating the boundary of the stroke with a path on the drawing.

A stroke is started by closing the thumb five samples are accumulated along the index finger and palm at adaptive sampling intervals until the thumb is released. This path defines a stroke. The stroke is fused to the drawing as shown in FIG. 11. The stroke is represented as a collection $S=(V_s, T_s, B)$ of vertices, triangles, and boundary vectors. The vertices $V_s \subset R^3$ include the original hand samples. The triangles $T_s$ are triples that index into $V_s$. The boundary vectors (b, b')$\in$B associate a vector in the tangent plane of the stroke with a vertex on the stroke's boundary, as shown in FIG. 11.

Figure 13A:
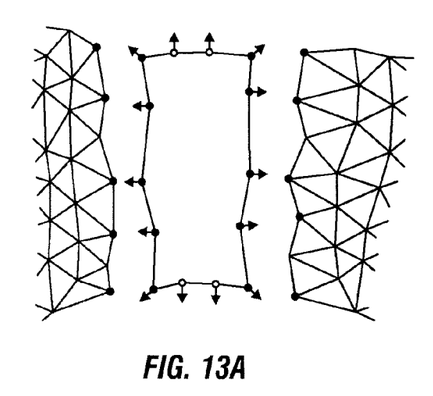
FIGS. 13A–13C shows steps of adding a surface.
Figure 13B:
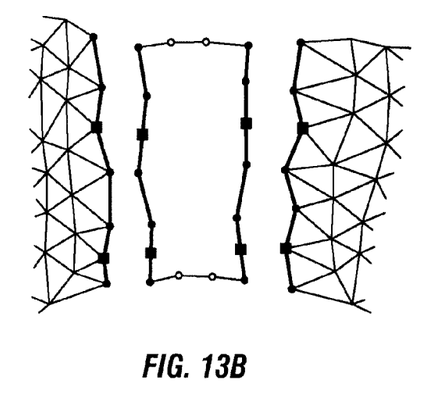
Figure 13C:
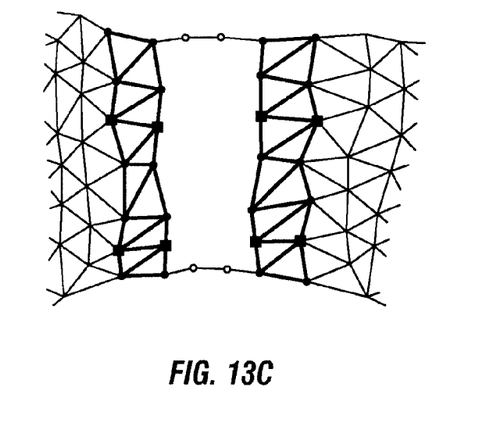

FIG. 13 shows: A new stroke (center; FIG. 13B) that merges two disconnected regions of the drawing. S8 (a) shows that using boundary vectors (arrows), the boundary points are matched with corresponding samples. Matched samples are represented as circles. Empty circles represent samples on the drawing with no matches. S8 (b) shows the matching samples being connected to form path pairs. Note that forming these paths requires the inclusion of extra samples (shown as squares) on the drawing. The stroke boundary is subdivided to accommodate these samples. S8 (c) shows triangles are formed between path pairs. These new triangles, along with the triangles in the stroke, are added to the drawing.

This stroke S is merged with the current model by associating a path on S's boundary with a path on the drawing. An example of a stroke merging two unconnected drawing regions is shown in FIG. 13. Given a drawing $D=(V_d, T_d)$, we find a set of ordered points M that lie in one-to-one correspondence with the entries of B. These matches are a function of both the stroke boundary and the drawing. The matches m∈M have the property that $$m_i = \underset{v_m \in V_d}{\operatorname{argmin}} d(v_m, b_i, b'_i)$$

If the minimum distance is above a preset threshold $m_i$ is set to NULL. The distance metric d consists of four parts $$d = \alpha_1(1 - \Delta \cdot b'') + \alpha_2(1 - \Delta \cdot v'') + \alpha_3(n \cdot \Delta) + s\|\Delta\|$$

with $\Delta = b_i - v$. The first three components measure the distance on $S^2$ between $\Delta$ and (i) the tangent plane defined by $b_i$'s normal $b''$; (ii) the tangent plane defined by $v''$; and (iii) the plane n defined by $b'_i$ and the normal vector at $b_i$. Finally it takes the Euclidean distance $\|\Delta\|$ itself into account. Normal vectors are estimated by averaging incident triangle normals. The values for the weights are based toward the boundary vectors, with $\alpha_1=0.5$, $\alpha_2=0.3$, and $\alpha_3=0.2$. The scale factor s is inversely proportional to the scale of the model. Hence, the Euclidean distance is always measured relative to the user's hand and not to the particular absolute scale of the model.

Path Generation

Once the matches are found, the list of stroke border points $b_i$ is iterated as $\in$B. Let bi be a sample with a match $m_{i+1} \neq$ NULL. The operation occurs by starting two paths: bPath on the stroke boundary and mPath, built from the set of matches M on the drawing. The operation continues to the next sample $b_{i+1}$ on the stroke boundary. If this sample has $m_{i+1} \neq$ NULL, the operation searches for a connection from $m_i$ to $m_{i+1}$. In the common case that $m_i$ and $m_{i+1}$ share an edge, $m_{i+1}$ added to mPath and $b_{i+1}$ is added to bPath.

If the shortest path from $m_i$ to $m_{i+1}$ contains multiple edges, the extra samples along that path are added to mPath before adding $m_{i+1}$. Concurrently, the stroke boundaries are subdivided so that it has the same number of samples between $b_i$ and $b_{i+1}$; these new samples and $b_{i+1}$ are added to bPath. Finally these individual paths are stored in path sets bPaths and mPaths, as illustrated in the following pseudocode.

```
BuildPaths(S, B, D, M)
    prevM = NULL;
        for(i=0 ... size(B)) {
            if(prevM != NULL) {
                shortestPath = BestPath(prevM, m_i);
                if (shortestPath.length( ) < L) {
                    n = shortestPath.nVertices( );
                    newStrokePath = SubdivideStroke(b_i, bPath.end( ),
                n);
                    mPath.push(shortestPath);
                    bPath.push(newStrokePath);
                }
                else if (!mPath.empty( )) {
                    mPaths.push(mPath);
                    mPath.clear( );
                    bPaths.push(bPath);
                    bPath.clear( );
                }
            }
            mPath.push(m_i);
            bPath.push(b_i);
            prevM = m_i;
        }
}
```

Figure 14:
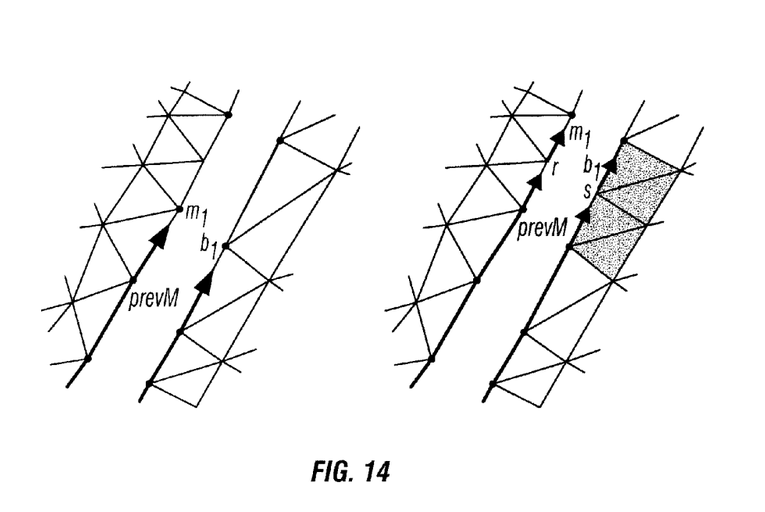
FIG. 14 shows building paths.

The algorithm BestPath(p, q) looks for a path between two vertices (p, q$\in V_s$) in the drawing in a greedy fashion, repeatedly choosing the closest vertex in the direction of q. SubdivideStroke(p, q, n) subdivides the edge between two adjacent vertices p and q on the stroke boundary, adding n new samples. An illustration of two iterations of this algorithm is given in FIG. 14 which shows Two steps of the algorithm build paths which constructs matching paths m path and B path on the drawing and the stroke boundary. (a) The paths are grown by adding samples $m_i$. (b) The paths are grown by adding an intermediate sample to each before adding $m_i$ and $b_i$. The stroke is subdivided to generate its intermediate sample.

Triangulation

Once the path sets mPaths and bPaths have been constructed, triangles are generated between each pair of paths. These triangles are formed by marching along the path pairs and connecting corresponding vertices. Note that an mPath will sometimes contain repeated elements. This situation is detected, and the degenerate triangle that would result is not added. These new triangles, along with the stroke's triangles, are added to the drawing to complete the stroke fusing operation.

Discussion

Comparing the stroke fusing approach to zippering raises the issue of the application of stroke fusing to range image integration. Here, stroke fusing has the advantage that it does not need to identify a coherent surface region that it is joining.

Figure 15:
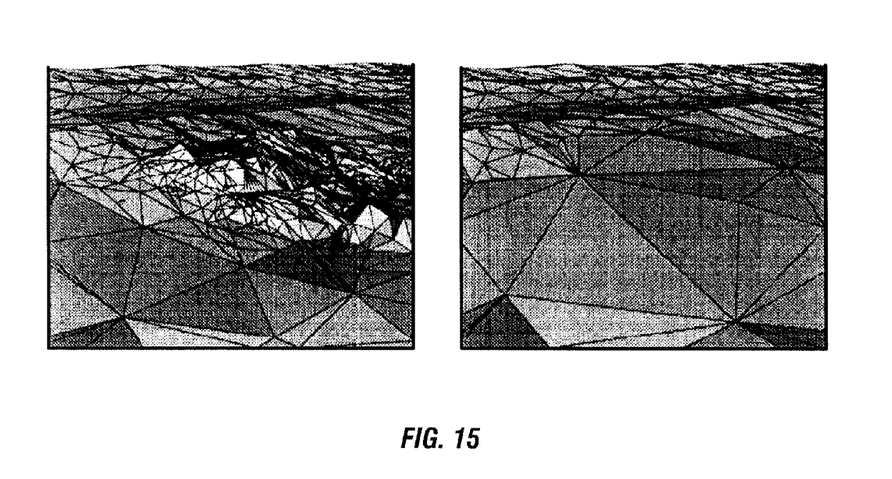
FIG. 15 shows inverting a mesh into a manifold.

Surface Smoothing is shown in FIG. 15 in which a topologically degenerate mesh region (left) is converted into a manifold.

The problem of generating smooth meshes without topological degeneracies is a fundamental issue of the Surface Drawing implementation. Due to the complexity of the unstructured mesh setting, operations with proven guarantees may be necessary. Developing such a structure is quite difficult because hand motions can be combined in arbitrarily complicated manner.

A strong topological restriction limits surfaces to topological manifolds-without-boundary. Since hand motions create patches and not volumes, this guarantee cannot be achieved during incremental construction. Alternatively surfaces may be generated that are manifold-with-boundary. The present invention has, experimented with such algorithms and the inventor discovered that this restriction is not sufficient. Boundary regions within the interior of a mesh can easily get tangled in certain ways. Objects which are not manifolds may exist that the user might want to create. Control of topology is put in the hands of the user with an operation that provably converts a local neighborhood of an unstructured triangle mesh into a manifold-without-boundary. In practice, sweeping this tool across a drawing turns a large region into a manifold-without-boundary.

Properties of this algorithm. First, we make the assumption that the neighborhood should be converted into an approximately planar region. This is indicated in the interface by grouping this operation with the smoothing tool, and representing it with the application of the flat face of a sponge. A region can be converted to a manifold. All of the triangles in the neighborhood are removed replaces them with a manifold region. The present system solves the more difficult problem of making this manifold region connect with the surrounding mesh.

Furthermore, applying the operation to a region that is already a manifold-without-boundary will maintain the mesh's manifold status.

In addition, if a portion of the region contained within the sphere of operation is manifold-with-boundary, it will remain so. Then the manifold region will be extended throughout the sphere.

The cutting algorithm is global and converts an entire mesh into a manifold in the topological sense. This is done primarily by duplicating vertices and edges. In Surface Drawing, duplicating vertices does not make a mesh look any smoother to the user; indeed the duplicated topology is often not wanted and should be removed.

Overview

The technique acts on an open neighborhood $B_r(x)=\{v \in V_d \text{ s.t. } \|d-x\|<r\}$. The basic idea is to find a closed ring in the mesh that is slightly outside of the neighborhood. If such a ring is not found in the mesh, the ring is constructed with heuristics. Tessellating this ring forms a disc, guaranteeing that the area in the neighborhood is manifold-without-boundary (since the boundary is outside of the neighborhood).

In cases where the original mesh is locally manifold, the removal of a disc is followed by the tessellation of that disc, leaving the mesh in its original manifold state. In cases where some manifold geometry goes through the neighborhood boundary, this manifold region is joined to the manifold geometry created within the neighborhood.

Throughout the algorithm, we make decisions based on the least-squares plane of the neighborhood, "LSQ".

Finding Border Edges

Figure 16A:
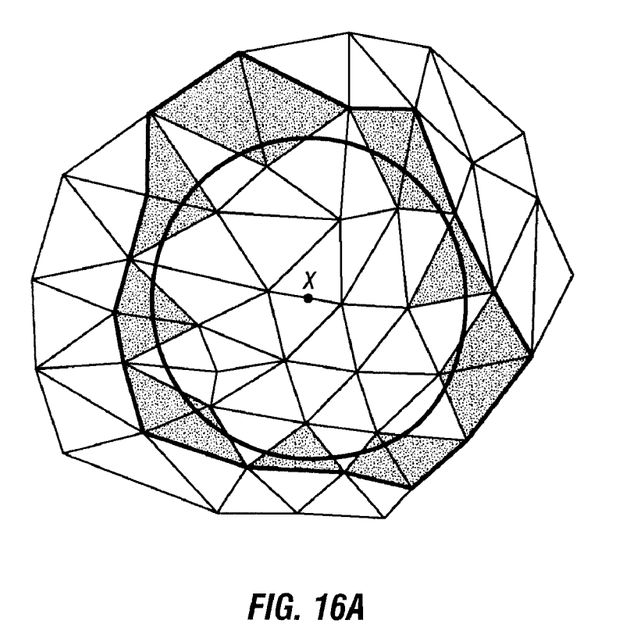
FIG. 16 shows border edges.
Figure 16B:
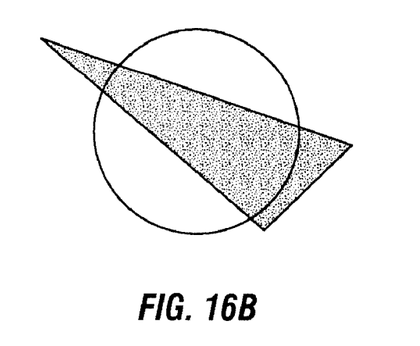
Figure 16C:
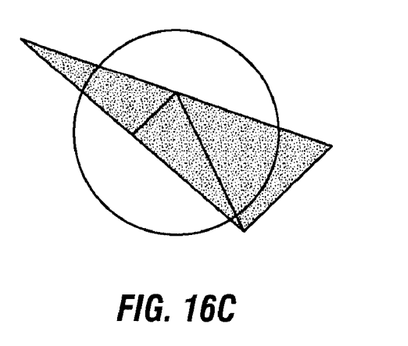

FIG. 16A shows a set of border edges (bold lines) that are discovered around the neighborhood $B\gamma(x)$. FIG. 16 B & C show edge splits are applied to triangles which are relatively large.

We begin by finding a set of border edges E that lie slightly outside of the operation's neighborhood, so that manifold geometry that is created can merge with the drawing. We take all triangles with one vertex inside $B_r(x)$ and two vertices outside and add each edge completely outside of the neighborhood as a border edge. These edges are depicted as bold lines in FIG. 16A.

$$E=\{e=(i,j)\cdot\exists(i,j,k)\epsilon T_d, \|v_i-x\|>r, \|v_j-x\|>r, \|v_k-x\|>r$$

Finding such edges is accomplished by a search over all triangles in the mesh; a spatial data structure is used to do this efficiently. This approach has problems when triangles are larger than the neighborhood; this case occurs when a triangle (i, j, k) is inside $B_r(x)$ but all of its vertices are outside of the neighborhood ($\|v_i-x\|>r$, $\|v_j-x\|>r$, $\|v_k-x\|>r$). Ignoring such a triangle hurts our operation as adjacent triangles could fail to be connected. We treat this situation by performing edge splits as shown in FIGS. 16B–16C. An edge e is split by adding the closest point on e to x ($p=\text{argmin}_{p\in e}\|p-x\|$). These edge splits are performed before the border edges are collected.

Figure 17:
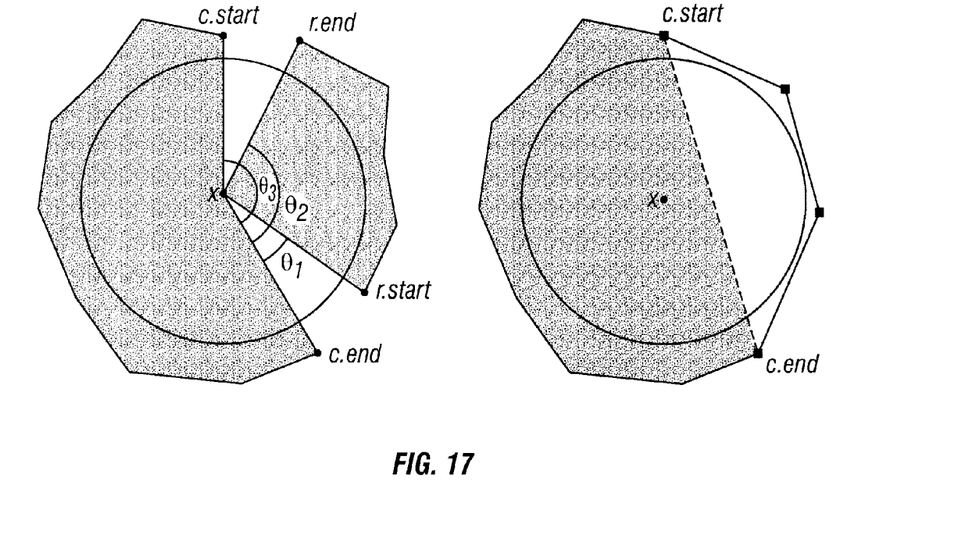
FIG. 17 shows concatenating rings.

FIG. 17 shows on the left, an open ring is only concatenated when $O_1<O_2$ and $O_2<O_3$. On the right, instead of adding an edge with a prohibitively large angle (dashed line) that would lie inside the circle, the square vertices are added.

Building Rings

We define a ring r to be a collection of edges $r=\{e_1, e_2, \ldots e_n\}$. Letting e[1] and e[2] be the vertices of an edge, a ring has the property that $e_i[2]=e_{i+1}[1]$, $\forall i \in \{1, n-1\}$. A ring is called closed if it has the additional property that $e_n[2]=e_1[1]$.

We build a set of rings R over the set of edges E by joining edges with a common vertex. When three or more border edges share a vertex we discard the edges with the shortest-length projection on least-squares plane LSQ.

To aid in piecing multiple rings together, we assign each ring r with an orientation based on its starting and ending vertices $e_1$ and $e_n$, and the normal LSQ.n of the least-squares plane. For each open ring, if the test $$((e_1-x)\times(e_2-x))\cdot(LSQ.n)>0$$

fails, we reverse the order of a ring.

Merging Open Rings is next described if no closed rings exist in the drawing, we construct one by merging open rings. We initialize the soon-to-be-closed ring as the maximum-length open ring. This currently-open ring is grown by repeatedly adding the optimal open ring to it. An optimal ring is the maximal-length ring that satisfies the following criterion, depicted on the left of FIG. 17.

$$\angle(c.\text{end}, r.\text{start})<\angle(c.\text{end}, r.\text{end})$$

$$\angle(c.\text{end}, r.\text{end})<\angle(c.\text{end}, c.\text{start})$$

This test indicates that this new ring is not likely to overlap with c. We add such a new ring r to c by first adding an edge (c.end, r.start), and then adding each of r's edges (in order) to c.

When can be grown no more, we close it by joining its endpoints. In some cases, such as the right of FIG. 17, such a join would go through the center of the sphere. This situation is handled by the addition of vertices.

Triangulation

Figure 18:
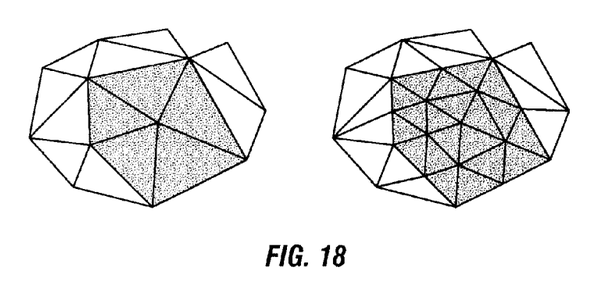
FIG. 18 illustrates ring tessellation.

Once we have a closed ring, if there were few vertices in the neighborhood, we form triangles between each of the edges of and the center x. This called Triangulation and is shown in FIG. 18. The speckled triangles in the left image represent a simple tessellation of a ring. If the original neighborhood has a large number of samples in it, this tessellation is subdivided and perturbed to approximate the initial geometry.

If there are many vertices in the neighborhood, we apply one step of subdivision to this triangulated region. We then move each newly created vertex $v_{new}$ along LSQ's normal direction towards the vertex $v_{closest} = \min_{v \in Vneighborhood} \|v_{new} - v_{closest}\|$.

Figure 19:
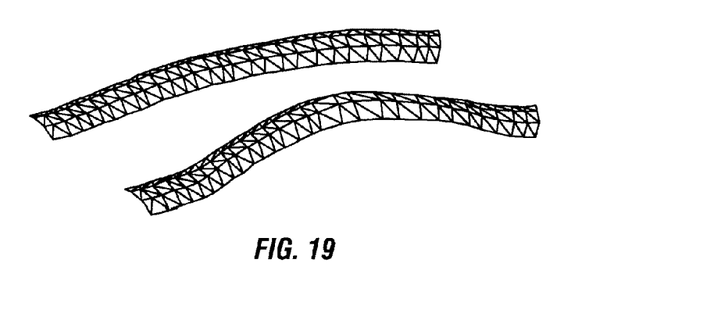
FIG. 19 illustrates a mesh.

Overdrawing is shown in FIG. 19:

Overdrawing is an operation that allows a drawing to be edited after it has been created. Cohen et al. experimented with the overdrawing of screen-space curves. When a stroke begins close to an extant drawing region (tolerance is set according to user skill), the drawing is perturbed toward the overdrawing finger.

At each time step, for each finger sample f and vertex v that is close to f we apply $$v\mathrel{+}= \frac{k(f-v) \cdot f'}{\|f-v\| + k + 1}$$

where f' is f's normal and $k = \min_{v \in Vd} \|v-f\|$.

Although only a few embodiments have been disclosed in detail above, other modifications are possible. For example, while the above describes tracking hand position, it is also possible to track positions of other body parts, e.g., the foot, tongue, eyes or the like.

All such modifications are intended to be encompassed in the following claims.

What is claimed is:

1. A method of producing a shape, comprising:
   using a virtual reality environment in which positions of a user's hand are tracked;
   forming a three-dimensional modeled surface by adding shapes defined by hand movements at each of a plurality of intervals; and
   wherein an inside surface of the hand is used to form the modeled surface, by tracking movement of a tangent to the hand, to define a tangent plane of a surface being created.

2. A method as in claim 1 wherein said using comprises tracking hand movement is tracked via a tracker and glove.

3. A method of producing a shape, comprising:
   using a virtual reality environment in which positions of a user's hand are tracked;
   forming a three-dimensional modeled surface by adding shapes defined by hand movements at each of a plurality of intervals, wherein an added shape comprises a surface region formed from sampled positions of a hand movement in the virtual reality environment during at least one of said intervals; and
   using an incremental technique to take an existing mesh of samples and changing it to add a new sample.

4. A method as in claim 3 further comprising defining a first hand position which defines a starting position and a second hand position which defines a stopping of drawing.

5. A method as in claim 3 further comprising defining a hand position which forms an eraser tool.

6. A method of producing a shape, comprising:
   using a virtual reality environment in which positions of a user's hand are tracked;
   forming a three-dimensional modeled surface by adding shapes defined by hand movements at each of a plurality of intervals;
   using an incremental technique to take an existing mesh of samples and changing it to add a new sample; and
   wherein said technique comprises finding a neighborhood of samples, identifying a surface region, removing identified parts, and creating new parts to replace the identified parts, where the new parts take a new sample into account.

7. A method as in claim 6 wherein said technique utilizes a projective plane to determine how the new parts should be formed.

8. A method of producing a shape, comprising:
   using a virtual reality environment in which positions of a user's hand are tracked;
   forming a three-dimensional modeled surface by adding shapes defined by hand movements at each of a plurality of intervals;
   wherein the surface is selected as a normal to the surface of the hand.

9. A method of producing a shape, comprising:
   using a virtual reality environment in which positions of a user's hand are tracked;
   forming a three-dimensional modeled surface by adding shapes defined by hand movements at each of a plurality of intervals, wherein an added shape comprises a surface region formed from sampled positions of a hand movement in the virtual reality environment during at least one of said intervals; and
   modifying the drawing using one of a plurality of props.

10. A method as in claim 9 wherein said props are tongs which can be squeezed and moved to rotate the shape.

11. A method as in claim 9 wherein said prop is a spherical ball.

12. A method as in claim 9 wherein said prop is a sponge which alters a look of the shape.

13. A method as in claim 12 wherein said altering is by smoothing.

14. A method of producing a shape, comprising:
    tracking a position of a user's hand;
    forming a three-dimensional modeled surface based on said position of said user's hand at different times;
    wherein said forming comprises using the hand to create 3d-strokes of shape; and
    wherein said samples are added by deprojecting a shape, removing parts, adding new parts, and reprojecting said shape.

15. A method of producing a shape, comprising:
    tracking a position of a user's hand; and
    forming a three-dimensional modeled surface by finding hand positions at different times, storing those positions, and forming the surface using said positions to define points on the actual surface that is formed;
    wherein a first hand posture comprises a start to track posture; and,
    using the finger to draw a narrower stroke.

16. A method as in claim 15, wherein said forming comprises using the hand to create 3d-strokes of shape.

17. A method as in claim 15, wherein said using comprises using the bend of the hand to define the curvature of 3d-strokes.

18. A method as in claim 15, further comprising
sensing at least 7 of the hand's degrees of freedom for the purposes of shape creation, said degrees of freedom including the hand's position and orientation in space, along with degrees of freedom that are affected by the hand's posture.

19. A method as in claim 15,
wherein said forming comprises using the hand to create 3d-strokes of shape, each 3d-stroke of shape comprising a plurality of points created in 3d-space by motion of the hand, the plurality of points defining the 3d-stroke of shape; and
further comprising merging samples from one hand position to an existing shape.

20. A method as in claim 15 further comprising using hand postures to switch between different modes of operation.

21. A method as in claim 15, wherein a second hand posture comprises a stop track posture.

22. A method as in claim 15, further comprising displaying different tools at the hand's position based on different postures.

\* \* \* \* \*